(12) United States Patent
Zhu et al.

(10) Patent No.: US 11,159,796 B2
(45) Date of Patent: Oct. 26, 2021

(54) DATA TRANSMISSION

(71) Applicant: SZ DJI TECHNOLOGY CO., LTD., Shenzhen (CN)

(72) Inventors: Lei Zhu, Shenzhen (CN); Hao Cui, Shenzhen (CN); Ying Chen, Shenzhen (CN); Ming Gong, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/514,559

(22) Filed: Jul. 17, 2019

(65) Prior Publication Data

US 2019/0342771 A1 Nov. 7, 2019

Related U.S. Application Data

(63) Continuation of application No. PCT/CN2017/071491, filed on Jan. 18, 2017.

(51) Int. Cl.
| | |
|---|---|
| *H04N 19/124* | (2014.01) |
| *H04N 19/146* | (2014.01) |
| *H04L 12/26* | (2006.01) |
| *H04W 24/02* | (2009.01) |
| *H04N 19/149* | (2014.01) |
| *H04L 1/00* | (2006.01) |
| *H04N 19/196* | (2014.01) |
| *H04N 19/19* | (2014.01) |
| *H04N 19/172* | (2014.01) |

(52) U.S. Cl.
CPC ......... *H04N 19/124* (2014.11); *H04L 43/087* (2013.01); *H04N 19/146* (2014.11); *H04N 19/149* (2014.11); *H04W 24/02* (2013.01); *H04L 43/0882* (2013.01)

(58) Field of Classification Search
None
See application file for complete search history.

(56) References Cited

U.S. PATENT DOCUMENTS

| | | |
|---|---|---|
| 7,062,429 B2 | 6/2006 | Faller |
| 2002/0143556 A1 | 10/2002 | Kadatch |
| 2005/0180500 A1 | 8/2005 | Chiang et al. |
| 2007/0009025 A1 | 1/2007 | Kwon et al. |

(Continued)

FOREIGN PATENT DOCUMENTS

| | | |
|---|---|---|
| CN | 1251725 A | 4/2000 |
| CN | 101800885 A | 8/2010 |

(Continued)

OTHER PUBLICATIONS

World Intellectual Property Organization (WIPO) International Search Report for PCT/CN2017/071491 dated May 2, 2017 5 pages.

(Continued)

*Primary Examiner* — Jay L Vogel
(74) *Attorney, Agent, or Firm* — Anova Law Group, PLLC (57) ABSTRACT

A data transmitting method includes generating multiple channels of encoded data by encoding same data to be encoded according to a plurality of bit rates and selecting encoded data to be transmitted from the multiple channels of encoded data according to a channel bandwidth of a transmission channel. The encoded data to be transmitted is one of the multiple channels of encoded data that matches the channel bandwidth.

11 Claims, 8 Drawing Sheets

(56) References Cited

U.S. PATENT DOCUMENTS

| | | |
|---|---|---|
| 2007/0013561 A1 | 1/2007 | Xu et al. |
| 2007/0016427 A1 | 1/2007 | Thumpudi et al. |
| 2007/0263720 A1 | 11/2007 | He |
| 2010/0061448 A1 | 3/2010 | Zhou et al. |
| 2010/0111163 A1 | 5/2010 | Yang et al. |
| 2010/0266047 A1 | 10/2010 | Takahashi et al. |
| 2011/0090960 A1* | 4/2011 | Leontaris ............. H04N 19/154 375/240.12 |
| 2012/0230400 A1 | 9/2012 | Lu et al. |
| 2013/0010859 A1 | 1/2013 | Schwaab et al. |
| 2013/0322516 A1* | 12/2013 | Zhang ................... H04N 19/61 375/240.02 |
| 2014/0153640 A1 | 6/2014 | Zhao et al. |
| 2014/0241419 A1* | 8/2014 | Holmer .............. H04N 21/2402 375/240.03 |
| 2014/0328384 A1 | 11/2014 | Novotny |
| 2014/0334553 A1 | 11/2014 | Novotny et al. |
| 2015/0319439 A1 | 11/2015 | Jang et al. |
| 2016/0227219 A1 | 8/2016 | Wang et al. |
| 2017/0085420 A1* | 3/2017 | Singh ...................... H04L 65/80 |
| 2017/0094301 A1* | 3/2017 | Gu ..................... H04N 21/2402 |
| 2017/0171103 A1* | 6/2017 | Gouache ................ H04L 65/80 |
| 2018/0139450 A1 | 5/2018 | Gao et al. |
| 2019/0342551 A1* | 11/2019 | Zhu ..................... H04N 19/146 |

FOREIGN PATENT DOCUMENTS

| | | |
|---|---|---|
| CN | 101867811 A | 10/2010 |
| CN | 101888542 A | 11/2010 |
| CN | 102036062 A | 4/2011 |
| CN | 102843351 A | 12/2012 |
| CN | 102868884 A | 1/2013 |
| CN | 102970540 A | 3/2013 |
| CN | 103379362 A | 10/2013 |
| CN | 105208390 A | 12/2015 |
| CN | 105898211 A | 8/2016 |
| CN | 106170089 A | 11/2016 |
| JP | H06292180 A | 10/1994 |
| JP | H07212757 A | 8/1995 |
| JP | H07264582 A | 10/1995 |
| JP | 2001524270 A | 11/2001 |
| JP | 2008283560 A | 11/2008 |
| JP | 2010252083 A | 11/2010 |
| WO | 9817065 A1 | 4/1998 |

OTHER PUBLICATIONS

World Intellectual Property Organization (WIPO) International Search Report and Written Opinion for PCT/CN2018/072444 dated Mar. 27, 2018 6 pages.

* cited by examiner

DATA TRANSMISSION

CROSS-REFERENCE TO RELATED APPLICATION

This application is a continuation application of International Application No. PCT/CN2017/071491, filed on Jan. 18, 2017, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to information technology and, more particularly, to a method, device, computer system, and mobile terminal for transmitting data.

BACKGROUND

Currently, the low-latency video/image transmission system that adapts to real-time variation in channel bandwidth has become a hot research and application field. Besides the source that varies over time, the channel also varies over time, particularly for the wireless channel. There are many factors affecting a wireless channel, such as the physical distance, relative position, and obstacles/occlusion between the receiving and transmitting terminals, the immediate electromagnetic interference, and the like. The source time-variation and the channel time-variation are independent of each other and are difficult to predict, which cause difficulties in adapting source encoding to the channel bandwidth in real-time. For example, when the channel is stable, a sudden movement of the camera or a large movement of the object in the camera view leads to a sudden change in the size of the encoded bitstream. If the size of the bitstream is doubled, the transmission latency/delay is doubled accordingly. When the source is stable, the size of the bitstream remains constant, but a sudden channel variation can still cause transmission jitter (transmission latency that varies over time). If the channel bandwidth becomes twice smaller, the transmission latency is increased by two times accordingly.

In conventional technologies, rate control algorithms stabilize the average bit rate over a given time period (e.g., several frames) at a given target bit rate to ensure that the overall jitter averaged over several frames or a period of time is small.

However, the conventional technologies only control the overall average latency of a frame group. The low-latency image transmission (simply, image transmission) requires to stabilize the transmission latency per frame within a certain range to avoid large fluctuations, which causes the playback to frequently stop at the receiving terminal. Therefore, in order to adapt to real-time variation in channel bandwidth, low-latency real-time control has become a technical problem to be solved urgently.

SUMMARY

In accordance with the disclosure, there is provided a data transmitting method including generating multiple channels of encoded data by encoding same data to be encoded according to a plurality of bit rates and selecting encoded data to be transmitted from the multiple channels of encoded data according to a channel bandwidth of a transmission channel. The encoded data to be transmitted is one of the multiple channels of encoded data that matches the channel bandwidth.

Also in accordance with the disclosure, there is provided a system including a memory storing computer executable instructions and a processor coupled to the memory. The processor is configured to execute the instructions to generate multiple channels of encoded data by encoding same data to be encoded according to a plurality of bit rates and select encoded data to be transmitted from the multiple channels of encoded data according to a channel bandwidth of a transmission channel. The encoded data to be transmitted is one of the multiple channels of encoded data that matches the channel bandwidth.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

The formulas in the present disclosure are merely exemplary formulas. Any modification of the formulas should fall within the scope of the present disclosure.

As used herein, the sequence numbers of processes do not represent the execution orders of the processes, which are determined by the function and inherent logic of the processes. The implementation process of the present disclosure is not limited thereto.

According to the present disclosure, the transmission latency of encoded data can be controlled in real-time. For example, when the channel bandwidth is varied with time, the transmission time per frame can be controlled within a certain range.

Figure 1:
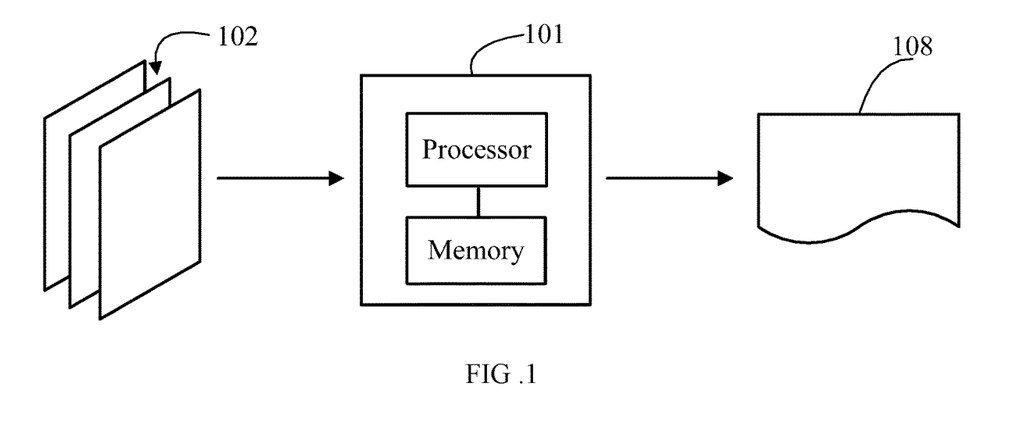
FIG. 1 is a schematic architecture diagram of a technical solution according to various exemplary embodiments.

FIG. 1 is a schematic architecture diagram of a technical solution consistent with the disclosure.

As shown in FIG. 1, a system 101 can receive and encode data to be encoded 102 to generate and transmit encoded data 108 over a channel, also referred to as a "transmission channel." For example, the system 101 can receive and compress video data to generate and transmit a compressed bitstream over the channel. In some embodiments, the components in the system 101 may be implemented by one or more processors. The one or more processors may be in a computing device or a mobile device such as an Unmanned Aerial Vehicle (UAV). The one or more processors may be any type of processor. The disclosure is not limited thereto. In some embodiments, the system 101 may also include one or more memories. The one or more memories may be configured to store instructions and data. For example, the one or more memories may be configured to store the data to be encoded 102, the encoded data 108, computer executable instructions for implementing the technical solution consistent with the present disclosure, and the like. The one or more memories may be any type of memory. The disclosure is not limited thereto.

In some embodiments, the system 101 may encode same data to be encoded 102 according to a plurality of bit rates to generate multiple channels of encoded data 108. One of the multiple channels of encoded data 108 that matches the current channel bandwidth may be selected to be transmitted.

In some embodiments, the system 101 may include an encoder implemented by the processor and the memory. The encoder is configured to receive and encode the data to be encoded 102 and generate the encoded data 108. In some embodiments, the encoder may be a multi-rate encoder, which can encode the data to be encoded 102 according to a plurality of bit rates, to generate the multiple channels of encoded data 108. In some embodiments, the system 101 may include a plurality of encoders, which can encode the data to be encoded 102 according to the plurality of bit rates, to generate the multiple channels of encoded data 108.

The data to be encoded 102 may include text, images, graphic objects, animated sequences, videos, or any other data that needs to be encoded. In some embodiments, the data to be encoded 102 may include sensor data obtained from a sensor. The sensor may be a vision sensor (e.g., a camera, an infrared sensor, or the like), a microphone, a near-field sensor (e.g., an ultrasonic sensor, a radar, or the like), a position sensor, a temperature sensor, a touch sensor, or the like. In some embodiments, the data to be encoded 102 may include user data, such as biological information, which may include facial features, fingerprint scanning information, retinal scanning information, voice recording information, DNA sampling information, and the like.

Encoding is commonly used to effectively and/or securely transmitting or storing data. The encoding of the data to be encoded 102 may include data compression, encryption, error-correction encoding, format conversion, and the like. For example, the compression of multimedia data (e.g., videos or audios) can reduce the number of bits transmitted in the network. Sensitive information, such as financial information, personal identification information, or the like, can be encrypted before transmission and storage to protect confidentiality and/or privacy.

Any suitable encoding technique may be used to encode the data to be encoded 102. The encoding type depends on the data to be encoded and the specific encoding requirement.

In some embodiments, the encoder can implement one or more different codecs. The codecs may include codes, instructions, or computer programs that implement different encoding algorithms. Based on various factors including the type and/or source of the data to be encoded 102, receiving entity of the encoded data, available computing resources, network environment, business environment, rules, criteria, and the like, a suitable encoding algorithm can be selected to encode the data to be encoded 102.

For example, the encoder can be configured to encode a series of video frames. Encoding data of a frame may include a series of processes. In some embodiments, the encoding process may include a prediction process, a transformation process, a quantization process, an entropy encoding process, and/or other processes.

Figure 2A:
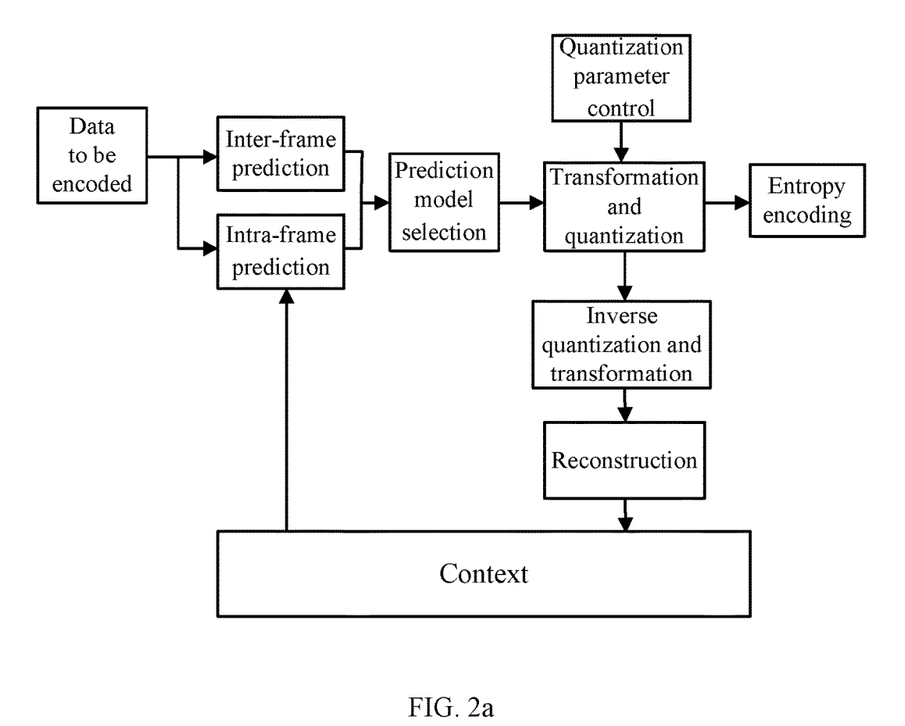
FIGS. 2a-2c are schematic architecture diagrams of encoders according to various exemplary embodiments.

FIG. 2a is an architecture diagram of an encoder consistent with the present disclosure. As shown in FIG. 2a, the prediction process may include intra-frame prediction and inter-frame prediction. In the prediction process, residual errors corresponding to data units can be obtained. The data unit may be a portion of data to be encoded. For example, the data unit may include data for one or more pixels. When the prediction process is employed on a pixel, a reconstructed reference pixel, which is generated by reconstructing a reference pixel, can be fetched from stored context. The residual error corresponding to the pixel can be obtained according to the values of the pixel and the reconstructed reference pixel. The residual error can then be transformed, quantized, and entropy encoded. In the quantization process, the bit rate can be controlled by adapting the quantization parameter. In some embodiments, multi-rate encoding can be realized by implementing the quantization process according to a plurality of quantization parameters. In some embodiments, the residual error corresponding to the pixel can be inversely transformed and quantized, and then be reconstructed to generate a reconstructed pixel. The reconstructed pixel may be stored in the context as a reference pixel for obtaining the residual errors of other pixels.

The quantization parameter may include a quantization step size, or a value representing or associated with the quantization step size. For example, the quantization parameter in H.264 or other similar encoders, a quantization matrix, a reference quantization matrix, or the like.

Figure 2B:
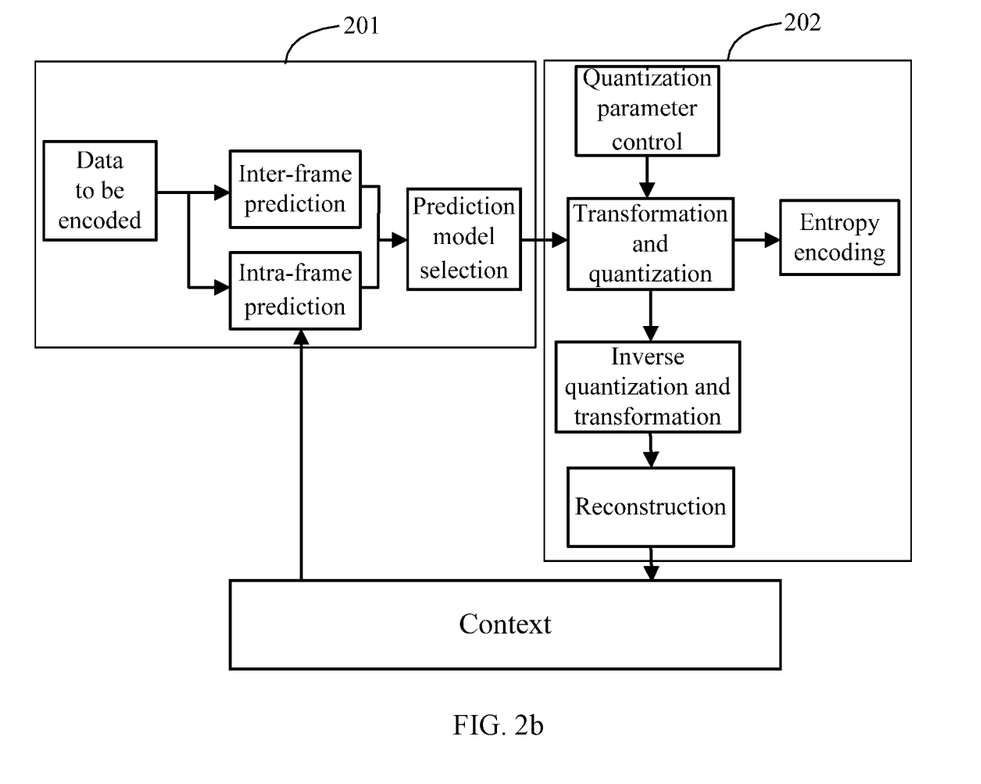

In some embodiments, a multi-rate encoder may be used to encode same data to be encoded according to a plurality of bit rates to generate multiple channels of encoded data. The multi-rate encoder may include a plurality of single-rate encoding modules corresponding to the plurality of bit rates. As shown in FIG. 2b, the plurality of single-rate encoding modules in the multi-rate encoder may share modules in the region 201 to share the same calculations for the prediction process and the prediction model selection process, of which the computational complexity and the computing resource consumption accounted for about 70% of the overall calculations of the encoder. The prediction model selection process determines which one of the intra-frame prediction or the inter-frame prediction may be selected for use. The plurality of single-rate encoding modules may include modules in the region 202, respectively, and provide encoded data with different bit rates according to the actual requirements. The multi-rate encoder with the structure described above can reduce resource consumption.

Figure 2C:
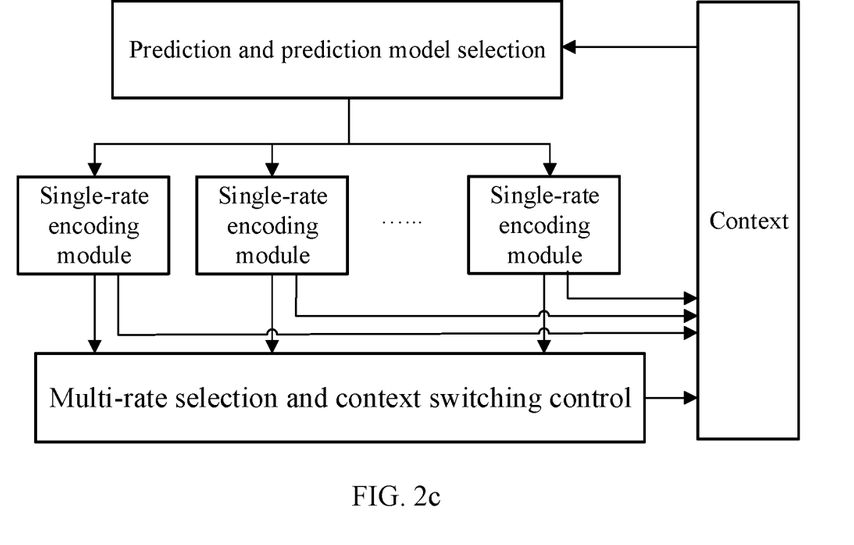

In some embodiments, as shown in FIG. 2c, one of the multiple channels of encoded data generated by the plurality of single-rate encoding modules that matches the current channel bandwidth may be selected to be transmitted. The context of the selected channel of encoded data can be used as the context of next data to be encoded. For example, the reconstructed data corresponding to the selected channel of encoded data may be stored as the reference for the prediction of a next frame.

Figure 3:
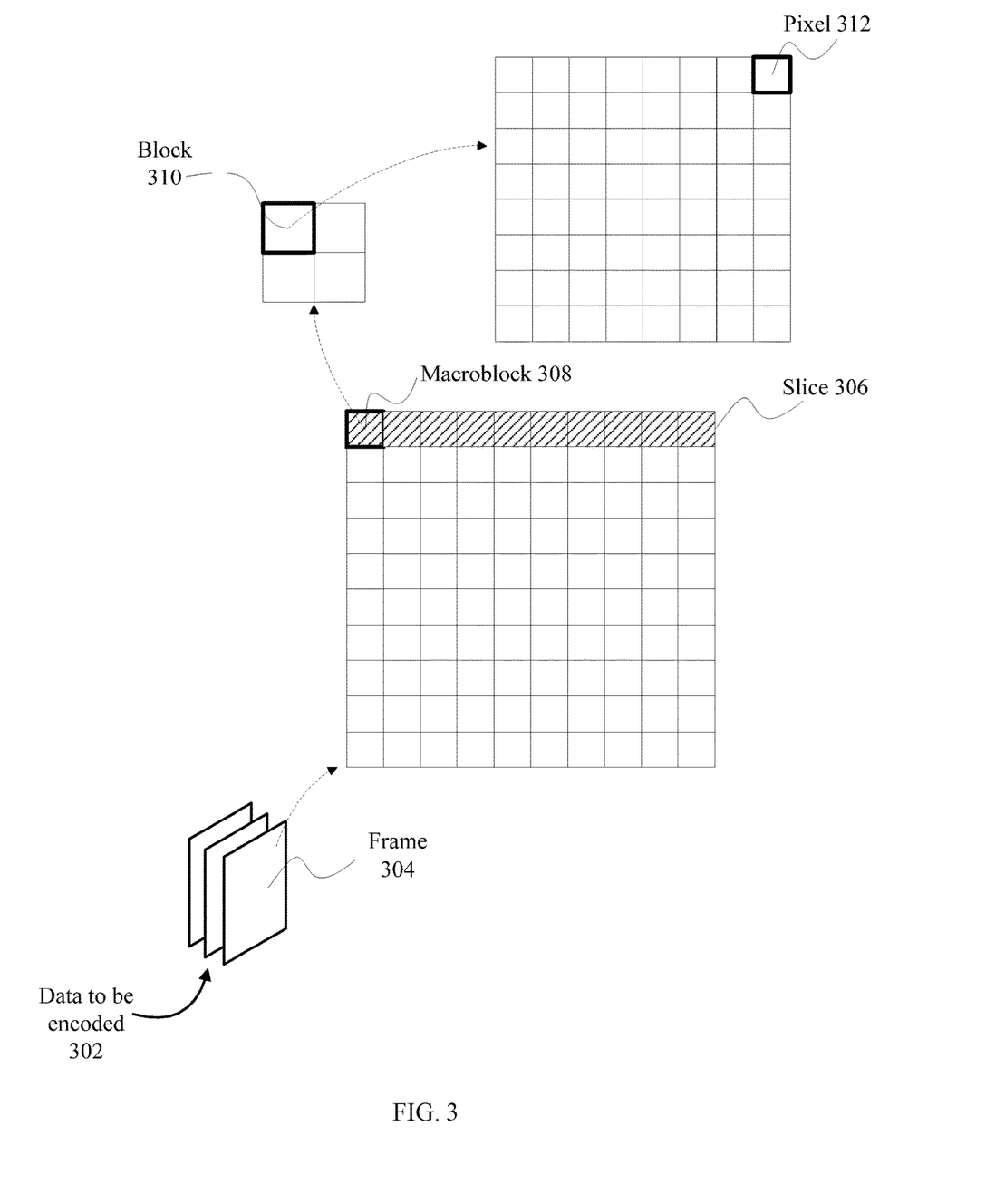
FIG. 3 is a schematic diagram of data to be encoded according to various exemplary embodiments.

FIG. 3 is a schematic diagram of data to be encoded consistent with the present disclosure.

As shown in FIG. 3, data to be encoded 302 includes a plurality of frames 304. For example, the plurality of frames 304 may represent a sequence of continuous image frames in a video stream. Each one of the plurality of frames 304 includes one or more slices 306. Each one of the one or more slices 306 includes one or more macroblocks 308. Each one of the one or more macroblocks 308 includes one or more blocks 310. Each one of the one or more blocks 310 includes one or more pixels 312. Each one of the one or more pixels 312 may include one or more data sets corresponding to one or more data elements, such as luminance and chrominance data elements. As described above, a data unit of the data to be encoded may include data for one or more pixels, such as data for a frame, a slice, a macroblock, a block, a pixel, or a combination of any of the above. In some embodiments, the size of the data unit may be unfixed. For example, a frame 304 may include 100 slices 306. One of the 100 slices 306 may include 10 macroblocks. One of the 10 macroblocks may include 4 (e.g., 2×2) blocks 310. One of the 4 blocks 310 may include 64 (e.g., 8×8) pixels 312.

In some embodiments, a mobile device, also referred to as a movable device, can implement the method for transmitting data consistent with the present disclosure. The mobile device may be a UAV, an unmanned boat, a robot, or the like. The disclosure is not limited thereto.

Figure 4:
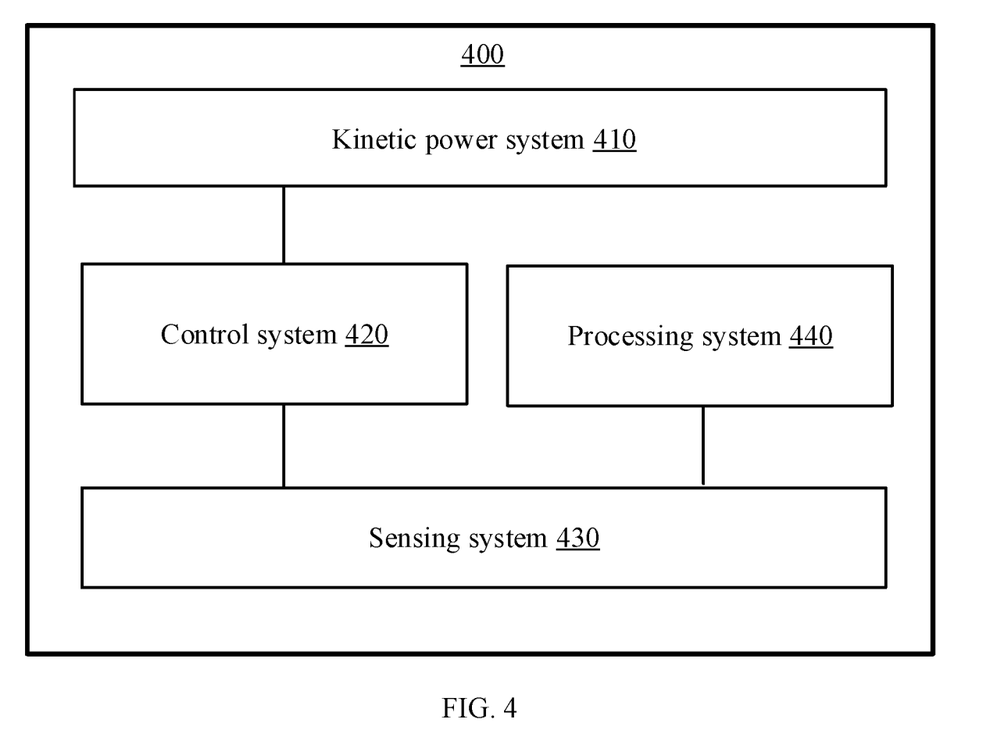
FIG. 4 is a schematic architecture diagram of a mobile device according to various exemplary embodiments.

FIG. 4 is a schematic architecture diagram of a mobile device 400 consistent with the present disclosure.

As shown in FIG. 4, the mobile device 400 includes a kinetic power system 410, a control system 420, a sensing system 430, and a processing system 440.

The kinetic power system 410 is configured to provide kinetic power for the mobile device 400.

Taking the UAV as an example, the kinetic power system of the UAV may include an electronic governor regulator (simply, electronic governor), a propeller, and a motor coupled to the propeller. The motor is connected between the electronic governor and the propeller. The motor and the propeller can be arranged on a corresponding arm. The electronic governor is used to receive a driving signal generated by the control system and supply the driving current to the motor to control the rotational speed of the motor according to the driving signal. The motor is used to drive the propeller to rotate so as to provide the kinetic power for the UAV to flight.

The sensing system 430 is configured to measure attitude information of the mobile device 400, e.g., location and status information of the mobile device 400 in the space, for example, three-dimensional position, three-dimensional angle, three-dimensional speed, three-dimensional acceleration, three-dimensional angular velocity, and the like. The sensing system 430 may include, for example, at least one of a gyroscope, an electronic compass, an Inertial Measurement Unit (IMU), a vision sensor, a Global Positioning System (GPS), a barometer, an airspeed meter, or the like.

According to the present disclosure, the sensing system 430 is also configured to acquire data to be encoded. That is, the sensing system 430 may include a sensor for acquiring the data to be encoded, such as a camera, a video camera, or the like.

The control system 420 is configured to control the movement of the mobile device 400. The control system 420 may control the mobile device 400 according to preset program instructions. For example, the control system 420 may control the movement of the mobile device 400 based on the attitude information of the mobile device 400 measured by the sensing system 430. The control system 420 may also control the mobile device 400 in response to a control signal from a remote control.

The processing system 440 is configured to process the data to be encoded acquired by the sensing system 430. For example, the processing system 440 may encode same data to be encoded according to a plurality of bit rates to generate multiple channels of encoded data, and select one of the multiple channels of encoded data that matches the current channel bandwidth for transmission.

In some embodiments, the processing system 440 may include the system 101 shown in FIG. 1.

The division and naming of the components of the mobile device 400 described above are merely exemplary and are not intended to limit the present disclosure.

The mobile device 400 may also include other components that are not shown in FIG. 4. The disclosure is not limited thereto.

Figure 5:
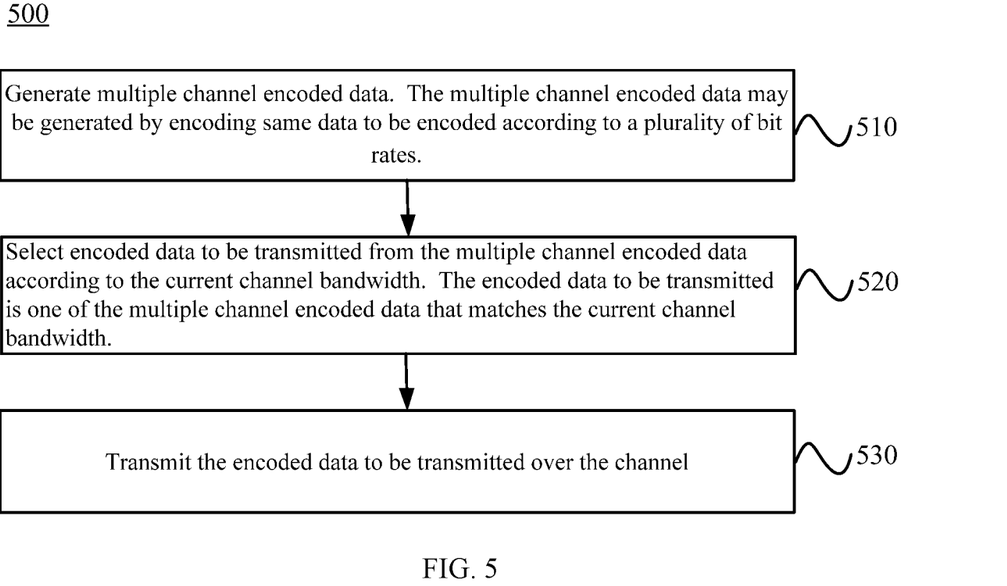
FIG. 5 is a schematic flow chart of a method for transmitting data according to an exemplary embodiment.

FIG. 5 is a schematic flow chart of a method for transmitting data 500 consistent with the present disclosure. The method 500 may be implemented by the system 101 shown in FIG. 1 or the mobile device 400 shown in FIG. 4. In some embodiments, the method 500 may be implemented by the processing system 440 shown in FIG. 4.

At 510, multiple channels of encoded data are generated. The multiple channels of encoded data may be generated by encoding same data to be encoded according to a plurality of bit rates.

According to the present disclosure, the multiple channels of encoded data corresponding to the plurality of bit rates are generated for the same data to be encoded. That is, the same data to be encoded is encoded according to the plurality of bit rates to generate the multiple channels of encoded data, which can be referred to as a multi-rate encoding process. The encoding process and other subsequent processes may be implemented by a same device or different devices. For example, a first device, such as an encoder, may implement the encoding process and send the multiple channels of encoded data to a second device, such as a transmitting device, for implementing the other subsequent processes. The other subsequent processes may include the channel selection process in which one of the multiple channels of encoded data is selected for transmission, the transmission process in which the selected encoded data is transmitted, and the like.

In some embodiments, the data to be encoded may be an image frame. That is, the image frame is encoded according to the plurality of bit rates to generate the multiple channels of encoded data.

In some embodiments, during the multi-rate encoding process, the prediction process may be first performed on the data to be encoded, and the quantization and entropy encoding processes may be then performed according to a plurality of quantization parameters.

In some embodiments, the multi-rate encoding process may share the relevant modules of the prediction process and use the modules of the quantization and entropy encoding processes, respectively. For example, a multi-rate encoder may be used to implement the multi-rate encoding process. The multi-rate encoder may include a common prediction module and a plurality of single-rate encoding modules. The common prediction module is configured to implement prediction process on the data to be encoded. The plurality of single-rate encoding modules are configured to implement the quantization and entropy encoding processes on data obtained from the common prediction module according to the plurality of quantization parameters. The computational complexity and the computing resource consumption can be reduced by sharing the common prediction module.

In some embodiments, the multi-rate encoding process may be implemented by a plurality of encoders. The plurality of encoders may encode the data to be encoded according to the plurality of bit rates.

In some embodiments, the plurality of quantization parameters corresponding to the plurality of bit rates may be arranged at a preset interval. For example, when the number of the channels of the multiple channels of encoded data (the number of encoded channels) is small, the plurality of quantization parameters may be arranged at a coarse preset interval to generate the plurality of bit rates over a wide range. When the number of encoded channels is relatively large, the plurality of quantization parameters may be arranged at a fine preset interval to generate the plurality of bit rates that are densely distributed over a certain range, such that the choice of the bit rate is richer.

At 520, encoded data to be transmitted is selected from the multiple channels of encoded data according to the current channel bandwidth. The encoded data to be transmitted is one of the multiple channels of encoded data that matches the current channel bandwidth.

In some embodiments, after the multiple channels of encoded data are generated, the one of the multiple channels of encoded data that matches the current channel bandwidth is selected as the encoded data to be transmitted. As such, the encoded data can be adapted to the time-varying channel bandwidth in real-time. That it, when the channel bandwidth is varied with time, the encoded data to be transmitted can match the channel bandwidth in real-time.

In some embodiments, the encoded data to be transmitted may be selected according to the channel bandwidth and a target latency.

The target latency may also be referred to as a control target of the latency, which represents an expected transmission latency.

In some embodiments, the encoded data to be transmitted may be one of the multiple channels of encoded data of which the transmission latency under the current channel bandwidth is closest to the target latency.

In some embodiments, the encoded data to be transmitted may be one of the multiple channels of encoded data of which the transmission latency under the current channel bandwidth is not more than and is closest to the target latency.

In some embodiments, the encoded data to be transmitted may be one of the multiple channels of encoded data with the highest bit rate among the multiple channels of encoded data where the difference between the target latency and the transmission latency under the current channel bandwidth is within a preset range.

Higher bit rates correspond to higher encoding qualities. The encoded data with the highest bit rate among the multiple channels of encoded data where the difference between the transmission latency and the target latency is within the preset range is selected, such that the encoded data with the highest encoding quality can be selected when the target latency is satisfied.

In some embodiments, the encoded data to be transmitted may be selected according to the channel bandwidth, the target latency, and the encoding quality. That is, the selection of the encoded data combines the requirements of the channel bandwidth, the target latency, and the encoding quality.

In some embodiments, the encoded data to be transmitted may be one of the multiple channels of encoded data with the highest encoding quality among the multiple channels of encoded data where the difference between the target latency and the transmission latency under the current channel bandwidth is within the preset range.

In some embodiments, a cost function may be determined according to the channel bandwidth, the target latency, the encoding quality, and a target bit rate. The encoded data to be transmitted may be one of the multiple channels of encoded data with the smallest value of the cost function.

For example, the cost function may be as follows:

$$\text{Cost} = A \times |\text{bit rate/bandwidth} - \text{target latency}| + B \times \text{encoding quality}$$

where Cost represents the cost, and A and B represent weights.

According to the requirements of different application scenario, the values of A and B can be adjusted to bias towards the requirement of the encoding quality or the requirement of the latency control.

It will be appreciated that the above described embodiments are part rather than all of the embodiments for implementing the selection of the encoded data. The present disclosure is not limited thereto.

In some embodiments, the context of the encoded data to be transmitted can be used as the context of next data to be encoded. That is, the context of the selected channel of encoded data can be used as the context of the next data to be encoded. For example, reconstructed data corresponding to the selected channel of encoded data may be stored as a reference for the prediction of a next frame.

At 530, the encoded data to be transmitted is transmitted over the channel.

The selected encoded data (the encoded data to be transmitted) can be transmitted. Because the encoded data to be transmitted is one of the multiple channels of encoded data that matches the current channel bandwidth, the transmission jitter can be reduced by transmitting the encoded data to be transmitted.

Therefore, according to the method for transmitting data consistent with the present disclosure, the multiple channels of encoded data are obtained by encoding the same data to be encoded according to the plurality of bit rates, and the one of the multiple channels of encoded data that matches the channel bandwidth is selected for transmission. The source-channel matching can be realized in real-time, such that the transmission latency of the encoded data can be controlled in real-time.

Figure 6:
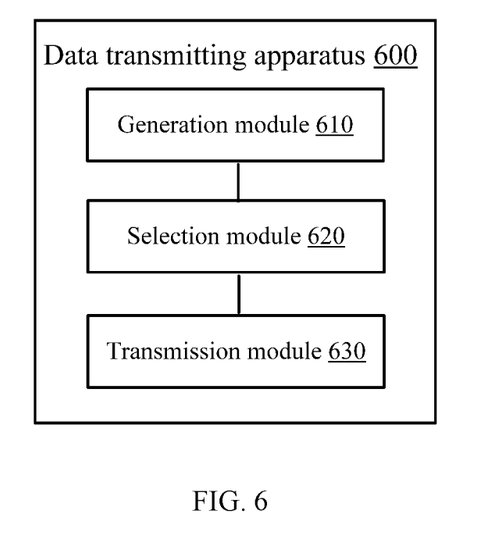
FIG. 6 is a schematic block diagram of an apparatus for transmitting data according to an exemplary embodiment.

FIG. 6 is a schematic block diagram of an apparatus for transmitting data 600 consistent with the present disclosure. The apparatus 600 can implement the method for transmitting data consistent with the present disclosure. The apparatus 600 may be arranged at a mobile device.

As shown in FIG. 6, the apparatus 600 includes a generation module 610, a selection module 620, a transmission module 630.

The generation module 610 is configured to generate multiple channels of encoded data. The multiple channels of encoded data may be generated by encoding same data to be encoded according to a plurality of bit rates.

The selection module 620 is configured to select encoded data to be transmitted from the multiple channels of encoded data according to the current channel bandwidth. The encoded data to be transmitted is one of the multiple channels of encoded data that matches the current channel bandwidth.

The transmission module 630 is configured to transmit the encoded data to be transmitted over the channel.

According to the apparatus for transmitting data consistent with the present disclosure, the multiple channels of encoded data are obtained by encoding the same data to be encoded according to the plurality of bit rates, and the one of the multiple channels of encoded data that matches the channel bandwidth is selected for transmission. The source-channel matching can be realized in real-time, such that the transmission latency of the encoded data can be controlled in real-time.

In some embodiments, the selection module 620 is configured to select the encoded data to be transmitted according to the channel bandwidth and a target latency.

In some embodiments, the encoded data to be transmitted may be one of the multiple channels of encoded data of which the transmission latency under the current channel bandwidth is closest to the target latency.

In some embodiments, the encoded data to be transmitted may be one of the multiple channels of encoded data of which the transmission latency under the current channel bandwidth is not more than and is closest to the target latency.

In some embodiments, the encoded data to be transmitted may be one of the multiple channels of encoded data with the highest bit rate among the multiple channels of encoded data where the difference between the target latency and the transmission latency under the current channel bandwidth is within the preset range.

In some embodiments, the selection module 620 is configured to select the encoded data to be transmitted according to the channel bandwidth, the target latency, and the encoding quality.

In some embodiments, the encoded data to be transmitted may be one of the multiple channels of encoded data with the highest encoding quality among the multiple channels of encoded data where the difference between the target latency and the transmission latency under the current channel bandwidth is within the preset range.

In some embodiments, a cost function may be determined according to the channel bandwidth, the target latency, the encoding quality, and the bit rate. The encoded data to be transmitted may be one of the multiple channels of encoded data with the smallest value of the cost function.

For example, the cost function may be as follows:

$$\text{Cost} = A \times |\text{bit rate}/\text{bandwidth} - \text{target latency}| + B \times \text{encoding quality}$$

where Cost represents the cost, and A and B represent the weights.

In some embodiments, the generation module 610 is configured to encode same data to be encoded according to a plurality of bit rates to generate the multiple channels of encoded data.

In some embodiments, the generation module 610 is configured to perform the prediction process on the data to be encoded, and then perform the quantization and entropy encoding processes according to a plurality of quantization parameters.

In some embodiments, the plurality of quantization parameters may be arranged at a preset interval.

In some embodiments, the generation module 610 is further configured to use the context of the encoded data to be transmitted as the context of next data to be encoded.

Figure 7:
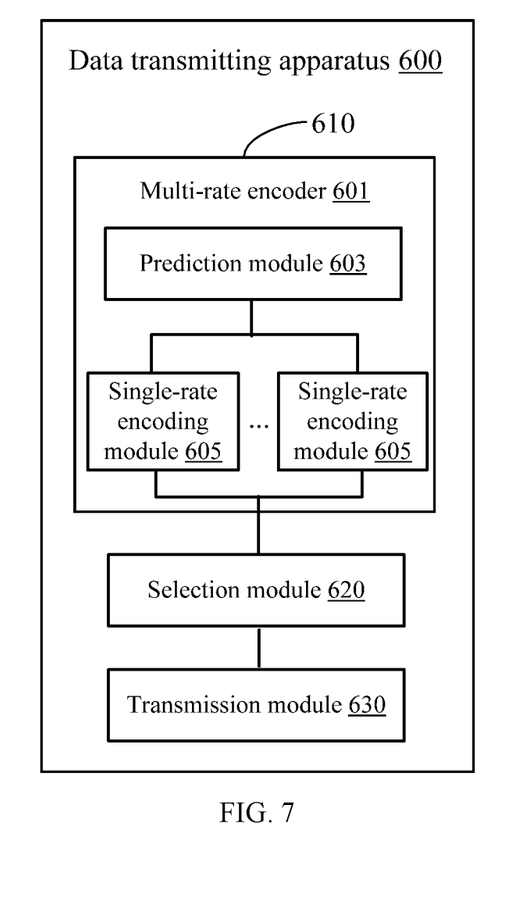
FIG. 7 is a schematic block diagram of an apparatus for transmitting data according to another exemplary embodiment.

In some embodiments, as shown in FIG. 7, the generation module 610 includes a multi-rate encoder 601.

The multi-rate encode is configured to encode the same data to be encoded according to the plurality of bit rates to generate the multiple channels of encoded data.

In some embodiments, as shown in FIG. 7, the multi-rate encode includes a prediction module 603 and a plurality of single-rate encoding modules 605.

The prediction module 603 is configured to implement the prediction process on the data to be encoded.

The plurality of single-rate encoding modules 605 are configured to implement the quantization and entropy encoding processes on data obtained from the prediction module 603 according to the plurality of quantization parameters.

In some embodiments, the prediction module 603 is further configured to use the context of the encoded data to be transmitted as the context of the next data to be encoded.

Figure 8:
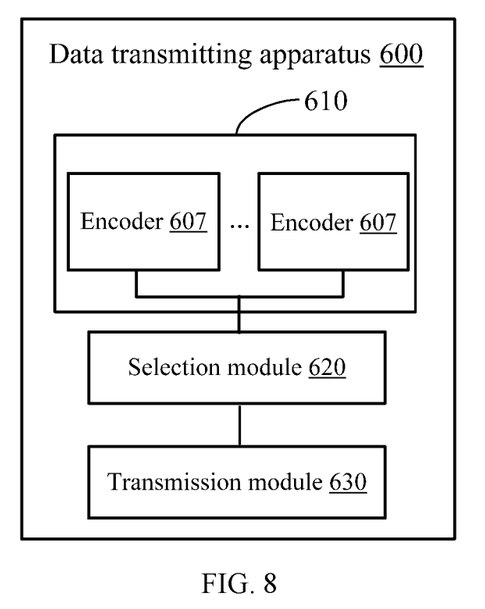
FIG. 8 is a schematic block diagram of an apparatus for transmitting data according to another exemplary embodiment.

In some embodiments, as shown in FIG. 8, the generation module 610 may include a plurality of encoders 607.

The plurality of encoders 607 are configured to encode the data to be encoded according to the plurality of bit rates.

In some embodiments, the data to be encoded may be an image frame.

Figure 9:
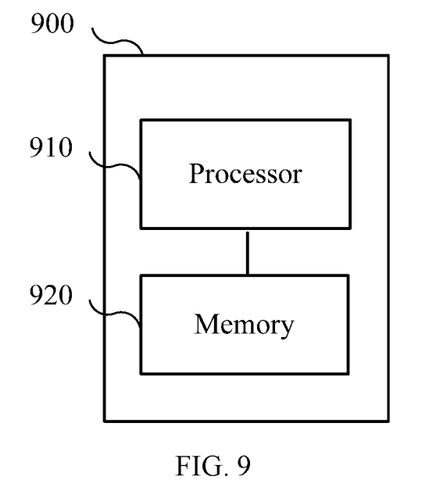
FIG. 9 is a schematic block diagram of a computer system according to an exemplary embodiment.

FIG. 9 is a schematic block diagram of a computer system 900 consistent with the present disclosure.

As shown in FIG. 9, the computer system 900 may include a processor 910 and a memory 920.

In some embodiments, the computer system 900 may also include components typically included in a common computer system, such as input and output devices, communication interfaces, and the like. The present disclosure is not limited thereto.

The memory 920 is configured to store computer executable instructions.

The memory 920 may be any type of memory, and may include, for example, a high-speed Random Access Memory (RAM) and/or a non-volatile memory, such as at least one disk memory. The present disclosure is not limited thereto.

The processor 910 is coupled to the memory 920 and is configured to execute the computer executable instructions stored in the memory 920 to implement a method for transmitting data consistent with the present disclosure, such as one of the above-described exemplary methods.

The processor 910 may include a microprocessor, a Field-Programmable Gate Array (FPGA), a Central Processing Unit (CPU), a Graphics Processing Unit (GPU), or the like. The present disclosure is not limited thereto.

Figure 10:
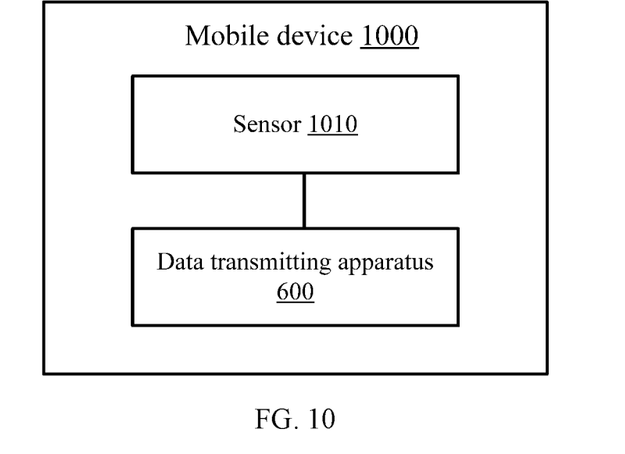
FIG. 10 is a schematic block diagram of a mobile device according to an exemplary embodiment.

FIG. 10 is a schematic block diagram of a mobile device 1000 consistent with the present disclosure. The mobile device 1000 may be a UAV, an unmanned boat, a robot, or the like.

As shown in FIG. 10, the mobile device 1000 includes a sensor 1010 configured to acquire data to be encoded and the apparatus for transmitting data 600 described above.

For example, the mobile device 1000 may be the mobile device 400 shown in FIG. 4. The sensor 1010 may be the sensor in the sensing system 430. The apparatus for transmitting data 600 may be arranged at the processing system 440.

Figure 11:
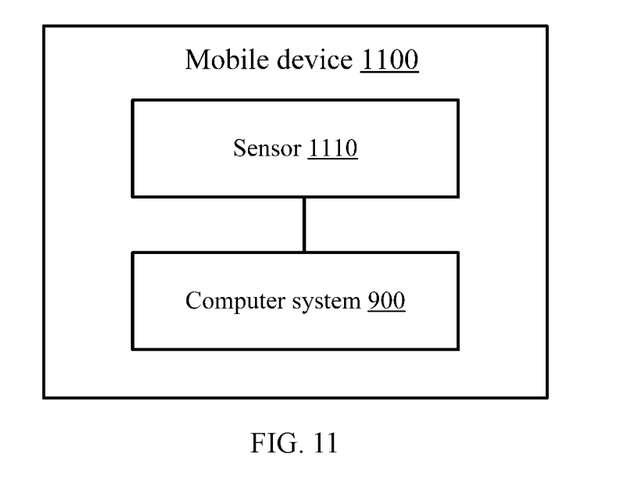
FIG. 11 is a schematic block diagram of a mobile device according to another exemplary embodiment.

FIG. 11 is a schematic block diagram of another mobile device 1100 consistent with the present disclosure. The mobile device 1100 may be a UAV, an unmanned boat, a robot, or the like.

As shown in FIG. 11, the mobile device 1100 may include a sensor 1110 configured to acquire data to be encoded and the computer system 900 described above.

For example, the mobile device 1100 may be the mobile device 400 shown in FIG. 4. The sensor 1110 may be the sensor in the sensing system 430. The computer system 900 may be arranged at the processing system 440.

The disclosed apparatus, computer system, and mobile device for transmitting data are the implementation entities of the disclosed method for transmitting data. The above-described and other operations and/or functions of the modules in the apparatus, computer system, and mobile device for transmitting data are used to implement the corresponding processes of the method described above, for which the detailed description is omitted.

A computer storage medium, such as a non-transitory computer-readable storage medium, that is consistent with the present disclosure is also provided. The computer storage medium may store program codes, which can be executed to perform a method for transmitting data consistent with the disclosure, such as one of the above-described exemplary methods.

The terms "and/or" is merely for illustrating that the associated objects have three relationships. For example, A and/or B may represent one of three situations, i.e., A alone, both A and B, and B alone. In addition, the character "/" between two items generally indicates an "or" relationship between the associated two items.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A data transmitting method comprising: generating multiple channels of encoded data by encoding same data to be encoded according to a plurality of bit rates; selecting encoded data to be transmitted from the multiple channels of encoded data according to a channel bandwidth of a transmission channel, the encoded data to be transmitted being one of the multiple channels of encoded data that matches the channel bandwidth; transmitting the encoded data of the selected channel, the encoded data of the selected channel including an image frame; and using reconstructed data of the transmitted image frame corresponding to the selected channel as a reference for encoding a next image frame to be transmitted wherein selecting the encoded data to be transmitted includes: selecting one of the multiple channels of encoded data with a smallest value of a cost function as the encoded data to be transmitted, the cost function being determined according to the channel bandwidth, a target latency, an encoding quality, a target bit rate, and weights A and B, wherein weight A is configured to bias the cost function towards a latency control, and weight B is configured to bias the cost function towards the encoding quality, the latency control being determined according to a difference between the target latency and a result of the target bit rate dividing the channel bandwidth.

2. The method of claim 1, wherein selecting the encoded data to be transmitted includes: selecting one of the multiple channels of encoded data, of which a transmission latency under the channel bandwidth is closest to the target latency out of the multiple channels of encoded data, as the encoded data to be transmitted.

3. The method of claim 1, wherein selecting the encoded data to be transmitted includes: selecting one of the multiple channels of encoded data, of which a transmission latency under the channel bandwidth is not more than and is closest to the target latency out of the multiple channels of encoded data, as the encoded data to be transmitted.

4. The method of claim 1, wherein selecting the encoded data to be transmitted includes: determining one or more of the multiple channels of encoded data that have a difference between the target latency and a transmission latency under the channel bandwidth within a preset range; and selecting one channel of encoded data that has a highest bit rate among the one or more of the multiple channels of encoded data as the encoded data to be transmitted.

5. The method of claim 1, wherein selecting the encoded data to be transmitted includes: determining one or more of the multiple channels of encoded data that have a difference between the target latency and a transmission latency under the channel bandwidth within a preset range; and selecting one channel of encoded data that has a highest encoding quality among the one or more of the multiple channels of encoded data as the encoded data to be transmitted.

6. The method of claim 1, wherein the cost function is:

$$Cost = A \times |\text{bit rate/bandwidth} - \text{target latency}| + B \times \text{encoding quality}$$

7. A system comprising: a memory storing computer executable instructions; and a processor coupled to the memory and configured to execute the instructions to: generate multiple channels of encoded data by encoding same data to be encoded according to a plurality of bit rates; select encoded data to be transmitted from the multiple channels of encoded data according to a channel bandwidth of a transmission channel, the encoded data to be transmitted being one of the multiple channels of encoded data that matches the channel bandwidth; transmitting the encoded data of the selected channel, the encoded data of the selected channel including an image frame; and using reconstructed data of the transmitted image frame corresponding to the selected channel as a reference for encoding a next image frame to be transmitted; wherein the encoded data to be transmitted is selected by: selecting one of the multiple channels of encoded data with a smallest value of a cost function as the encoded data to be transmitted, the cost function being determined according to the channel bandwidth, a target latency, an encoding quality, a target bit rate, and weights A and B, wherein weight A is configured to bias the cost function towards a latency control, and weight B is configured to bias the cost function towards the encoding quality, the latency control being determined according to a difference between the target latency and a result of the target bit rate dividing the channel bandwidth.

8. The system of claim 7, wherein the processor is further configured to execute the instructions to: select one of the multiple channels of encoded data, of which a transmission latency under the channel bandwidth is closest to the target latency out of the multiple channels of encoded data, as the encoded data to be transmitted.

9. The system of claim 7, wherein the processor is further configured to execute the instructions to: select one of the multiple channels of encoded data, of which a transmission latency under the channel bandwidth is not more than and is closest to the target latency out of the multiple channels of encoded data, as the encoded data to be transmitted.

10. The system of claim 1, wherein the processor is further configured to execute the instructions to: determine one or more of the multiple channels of encoded data that have a difference between the target latency and a transmission latency under the channel bandwidth within a preset range; and select one channel of encoded data that has a highest bit rate among the one or more of the multiple channels of encoded data as the encoded data to be transmitted.

11. The system of claim 7, wherein the processor is further configured to execute the instructions to: determine one or more of the multiple channels of encoded data that have a difference between the target latency and a transmission latency under the channel bandwidth within a preset range; and select one channel of encoded data that has a highest encoding quality among the one or more of the multiple channels of encoded data as the encoded data to be transmitted.

* * * * *